US009127979B2

(12) United States Patent
Cheng et al.

(10) Patent No.: US 9,127,979 B2
(45) Date of Patent: Sep. 8, 2015

(54) OPTICAL MEASURING SYSTEM AND OPTICAL MEASURING DEVICE THEREOF

(71) Applicant: Industrial Technology Research Institute, Hsinchu (TW)

(72) Inventors: Chen-Chin Cheng, Hsinchu (TW); Jian-Shian Lin, Yilan (TW); Min-Chieh Chou, Taipei (TW); Yu-Tang Chen, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 62 days.

(21) Appl. No.: 14/026,947

(22) Filed: Sep. 13, 2013

(65) Prior Publication Data
US 2014/0078496 A1    Mar. 20, 2014

(30) Foreign Application Priority Data

Sep. 14, 2012   (TW) .............................. 101133839 A

(51) Int. Cl.
*G01J 1/04* (2006.01)
*G01J 1/02* (2006.01)
*G01J 1/42* (2006.01)

(52) U.S. Cl.
CPC ............. *G01J 1/0204* (2013.01); *G01J 1/0271* (2013.01); *G01J 1/0422* (2013.01); *G01J 2001/0481* (2013.01); *G01J 2001/4252* (2013.01)

(58) Field of Classification Search
CPC ................. G01J 2001/4252; G01J 2001/0481; G01J 1/0422; G01J 1/0271; G01J 1/0204; G01N 2201/065; G01R 31/2635
See application file for complete search history.

(56) References Cited

U.S. PATENT DOCUMENTS

| 5,954,424 | A  | * | 9/1999  | Anderson et al. ............. 362/242 |
| 7,022,969 | B2 | * | 4/2006  | Bulpitt ......................... 250/216 |
| 7,280,196 | B2 | * | 10/2007 | Hart et al. .................... 356/236 |
| 7,804,589 | B2 |   | 9/2010  | Tseng et al. |
| 7,812,624 | B1 |   | 10/2010 | Wei et al. |
| 7,973,917 | B2 |   | 7/2011  | Liu et al. |

(Continued)

FOREIGN PATENT DOCUMENTS

| CN | 101183025 A | 5/2008 |
| CN | 101339092 A | 1/2009 |

(Continued)

OTHER PUBLICATIONS

Intellectual Property Office, Ministry of Economic Affairs, R.O.C., "Office Action", Aug. 14, 2014, Taiwan.

(Continued)

*Primary Examiner* — Michael A Lyons
*Assistant Examiner* — Shawn Decenzo
(74) *Attorney, Agent, or Firm* — Locke Lord LLP; Tim Tingkang Xia, Esq.

(57) ABSTRACT

An optical measuring device includes a case, a reflective layer and a light collecting lens module. A measuring chamber and a channel, which is connected to the measuring chamber and is connected to an opening of the case, reside in the case. The reflective layer is disposed onto an inner surface of the measuring chamber. The light collecting lens module is located inside the channel. A light beam emits into the channel of the optical measuring device through an opening, passes through the light collecting lens module and enters the measuring chamber afterward.

12 Claims, 8 Drawing Sheets

(56) References Cited

U.S. PATENT DOCUMENTS

| | | | |
|---|---|---|---|
| 2006/0187444 A1 | 8/2006 | Tsuchimichi et al. | |
| 2008/0165350 A1 | 7/2008 | Huang et al. | |
| 2009/0236506 A1* | 9/2009 | Dudgeon et al. | 250/228 |
| 2011/0267087 A1 | 11/2011 | Huang | |
| 2013/0313444 A1* | 11/2013 | Simonian et al. | 250/459.1 |

FOREIGN PATENT DOCUMENTS

| | | |
|---|---|---|
| CN | 102645276 A | 8/2012 |
| TW | I278644 | 4/2007 |
| TW | M312668 | 5/2007 |
| TW | M332851 U | 5/2008 |
| TW | 201038928 A | 11/2010 |
| WO | 2012085824 A1 | 6/2012 |

OTHER PUBLICATIONS

Zou Xiyong et al., An Integrated Measurement System for LED Thermal, Optical and Electrical Characteristics, Proc. Of SPIE, 2007, 66241Q-1-9, vol. 6624.

Kai-Ping Chuang et al., Imaging Spectrograph for Fast LED Optical Properties Measurement, Proc. of SPIE, 2011, 832126-1-7, vol. 8321.

C. Cameron Miller et al., LED photometric calibrations at the National Institute of Standards and Technology and future measurement needs of LEDs, Proc. of SPIE, 2004, p. 69-79, vol. 5530.

Bryan Bolt et al., LED test, Test & Measurement World, 2010, p. 37-43, Semiconductor Test.

Measurement of LEDs, CIE 127:2007, 2nd edition, Technical Report, ISBN 978 3 901 906 58 9.

Yoshi Ohno, Optical metrology for LEDs and solid state lighting, Proc. of SPIE, 2006, 604625-1-8, vol. 6046.

Kazuaki Ohkubo et al., Total luminous flux measurement system using integrating hemisphere photometer, J. Light & Vis, Env., 2011, p. 76-85, vol. 35, No. 1.

Numerical aperture, Wikipedia, the free encyclopedia, Search Date Apr. 27, 2015, Jan. 6-Jun. 6, http://en.wikipedia.org/wiki/Numerical_aperture.

Robert E. Fischer et al., Optical System Design, SPIE Press, Optical Engineering, 2000, p. 8.

State Intellectual Property Office of the P.R.C, "Office Action", Jun. 25, 2015, China.

* cited by examiner

OPTICAL MEASURING SYSTEM AND OPTICAL MEASURING DEVICE THEREOF

CROSS-REFERENCE TO RELATED APPLICATION

This non-provisional application claims priority under 35 U.S.C. §119(a) on Patent Application No(s). 101133839 filed in Taiwan, R.O.C. on Sep. 14, 2012, the entire contents of which are hereby incorporated by reference.

BACKGROUND

1. Technical Field

The present disclosure relates to an optical measuring system and an optical measuring device thereof, specifically, an optical measuring system and an optical measuring device with light collecting lens modules.

2. Related Art

At each stage of the light emitting diode (LED) production, the use of measuring devices to measure the properties of the LED in electricity, radiometry, photometry and colorimetry is required. The method of measuring the LED luminous flux, for example, is to place the LED inside an integrating sphere, which is connected to a photodetector. Once the power is on and lights up the LED, the light emitted from the LED scatters uniformly all over the inner surface of the integrating sphere and the illuminance on the inner surface of the integrating sphere is detected by the photodetector in order to measure the total luminous flux of the LED.

When the LED production is still at its wafer stage prior to cutting the LEDs apart, a pair of test needles is used to transmit electricity to the electrodes of the LED chip as a means to light it up. However, due to the size of the LED wafer, the measuring process is conducted with the LED sitting outside the integrating sphere instead of within thereof. The light emitted by the LED, which resides outside the integrating sphere, enters the integrating sphere through an opening on the integrating sphere and a photodetector then intercepts the light, which has been uniformly scattered inside the integrating sphere, for calculation.

Due to the spatial distribution of the light emitted from LED, the further distance between the integrating sphere and the LED is, the opening on the integrating sphere needs to be bigger for flux measurement, and the bigger the integrating sphere is needed therefore. According to the design principle, the area of the opening on the integrating sphere shall be less than 5% of the inner surface of the integrating sphere. Therefore, the diameter of the integrating sphere currently adopted by industry for measuring the luminous flux of the LED at its wafer stage reaches 2 inches or larger.

There are several LED dices on one wafer when the LEDs production is at its wafer stage. Being able to measure multiple LEDs on the same wafer simultaneously can increase the measuring efficiency dramatically. However, the size of the integrating sphere is comparably large, thus making it impossible to place multiple integrating spheres above a wafer to measure several LEDs simultaneously. As a result, the efficiency of inspecting the optical properties of LEDs during wafer level is difficult to improve.

SUMMARY

The optical measuring device in the present disclosure includes a case, a reflective layer and a light collecting lens module. A measuring chamber and a channel, which is connected to the measuring chamber and leads to an opening of the case, reside in the case. The reflective layer is disposed onto an inner surface of the measuring chamber. The light collecting lens module is located inside the channel. A light beam emits into the channel of the optical measuring device through an opening, passes through the light collecting lens module and enters the measuring chamber afterward.

The optical measuring system of the present disclosure includes a base, a plurality of optical measuring devices, a plurality of power supply connectors and at least a detection processor. Each of these optical measuring devices, which are mounted on the base, comprises a case, a reflective layer and a light collecting lens module. A measuring chamber and a channel, which is connected to the measuring chamber and leads to an opening of the case, reside in the case. The reflective layer is disposed onto an inner surface of the measuring chamber. The light collecting lens module is located inside the channel. Each of the plurality of power supply connectors is located at the opening of each case respectively and the detection processor is connected to a plurality of measuring chambers.

The features, implementation and advantages of the present disclosure included are presented in the context of the state of the art, accompanied by drawings in which the structure of the invention is shown by examples, in order to offer further explanations of the proposed disclosure.

BRIEF DESCRIPTION OF THE DRAWINGS

The present disclosure is more fully understood from the detailed description given herein below for illustration only, and thus are not limitative of the present disclosure, and wherein.

DETAILED DESCRIPTION

Figure 1:
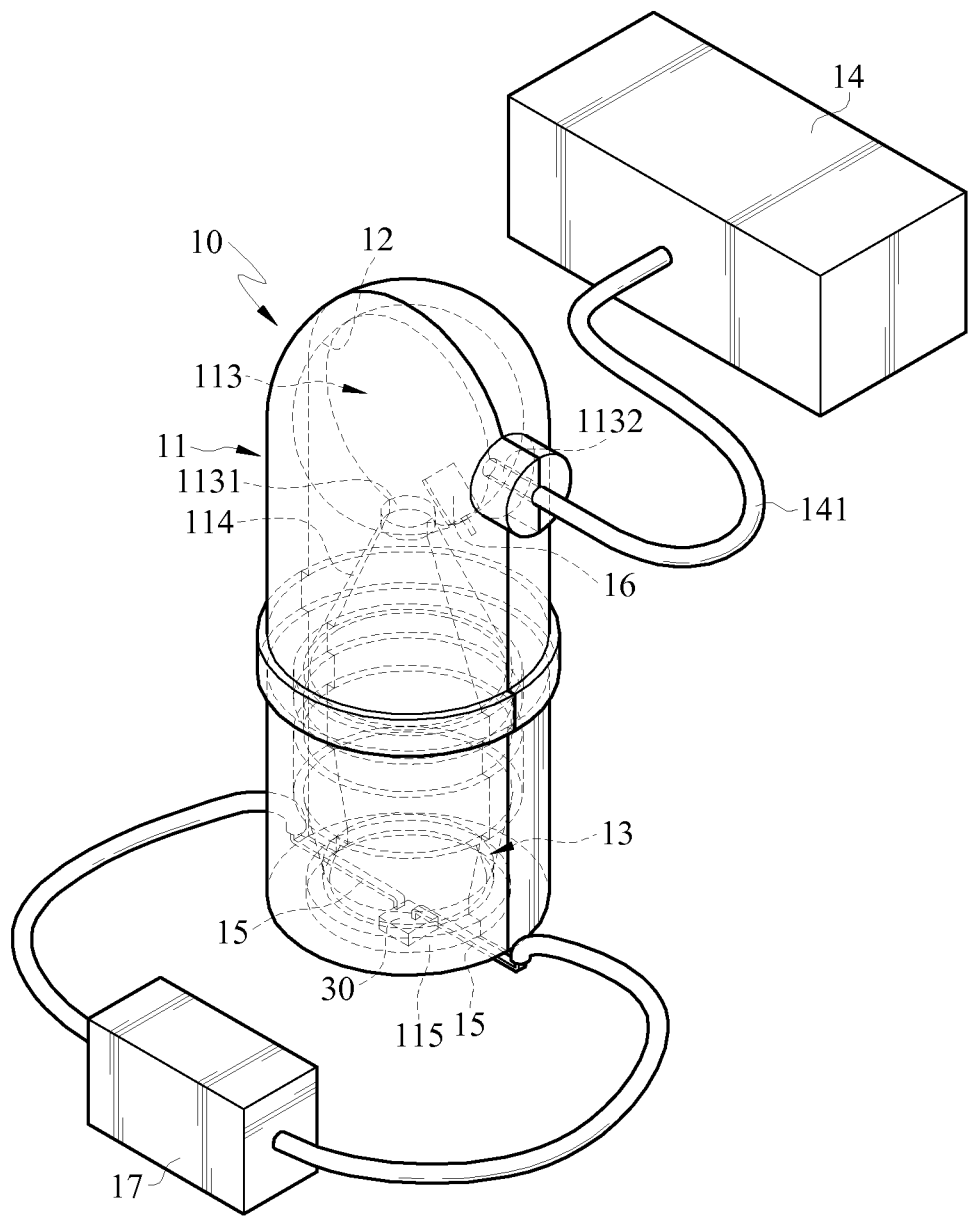
FIG. 1 is a schematic view of an embodiment of the optical measuring device of the present disclosure.
Figure 2:
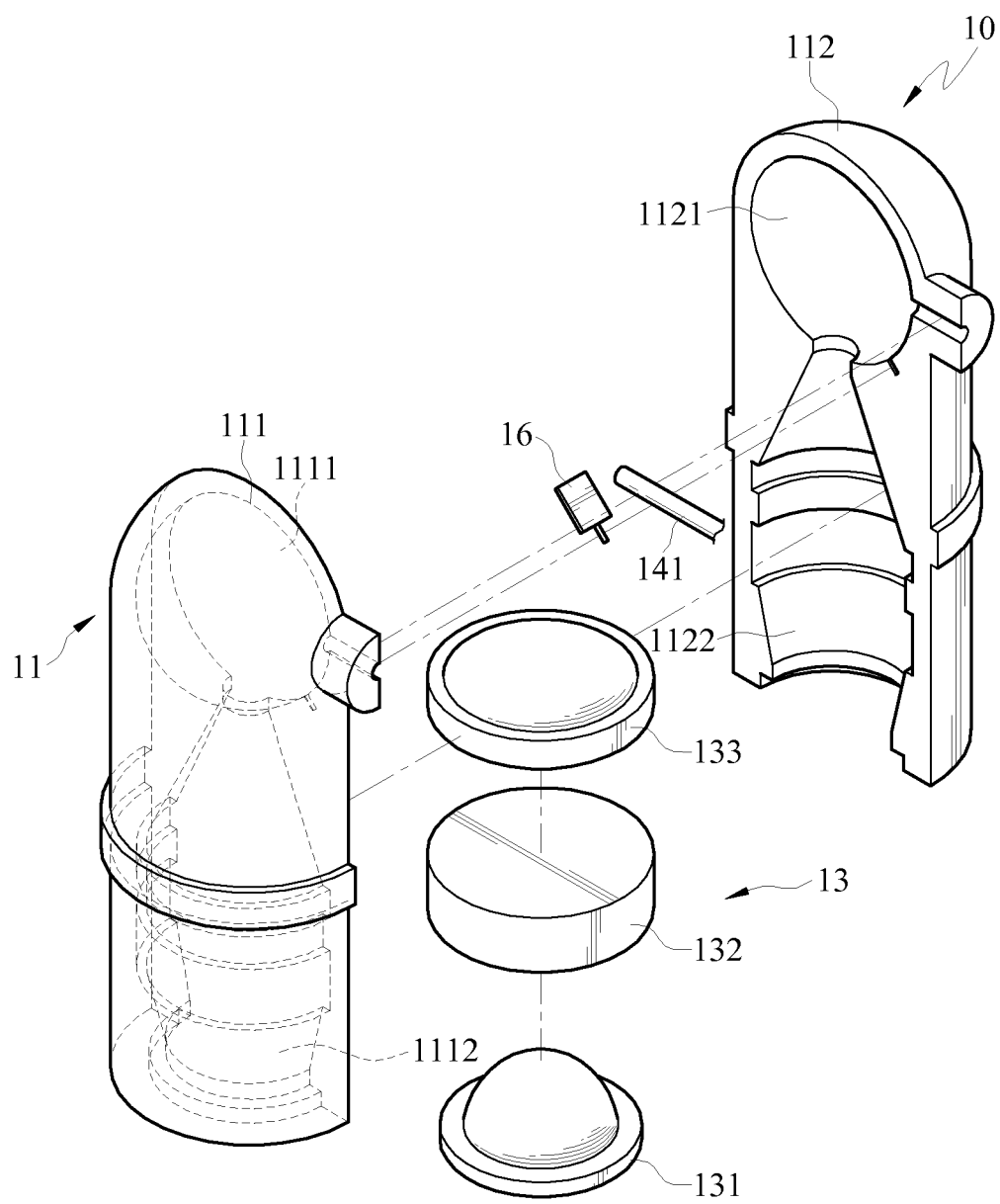
FIG. 2 is a partial assembly section view of the embodiment the present disclosure described in FIG. 1.
Figure 3:
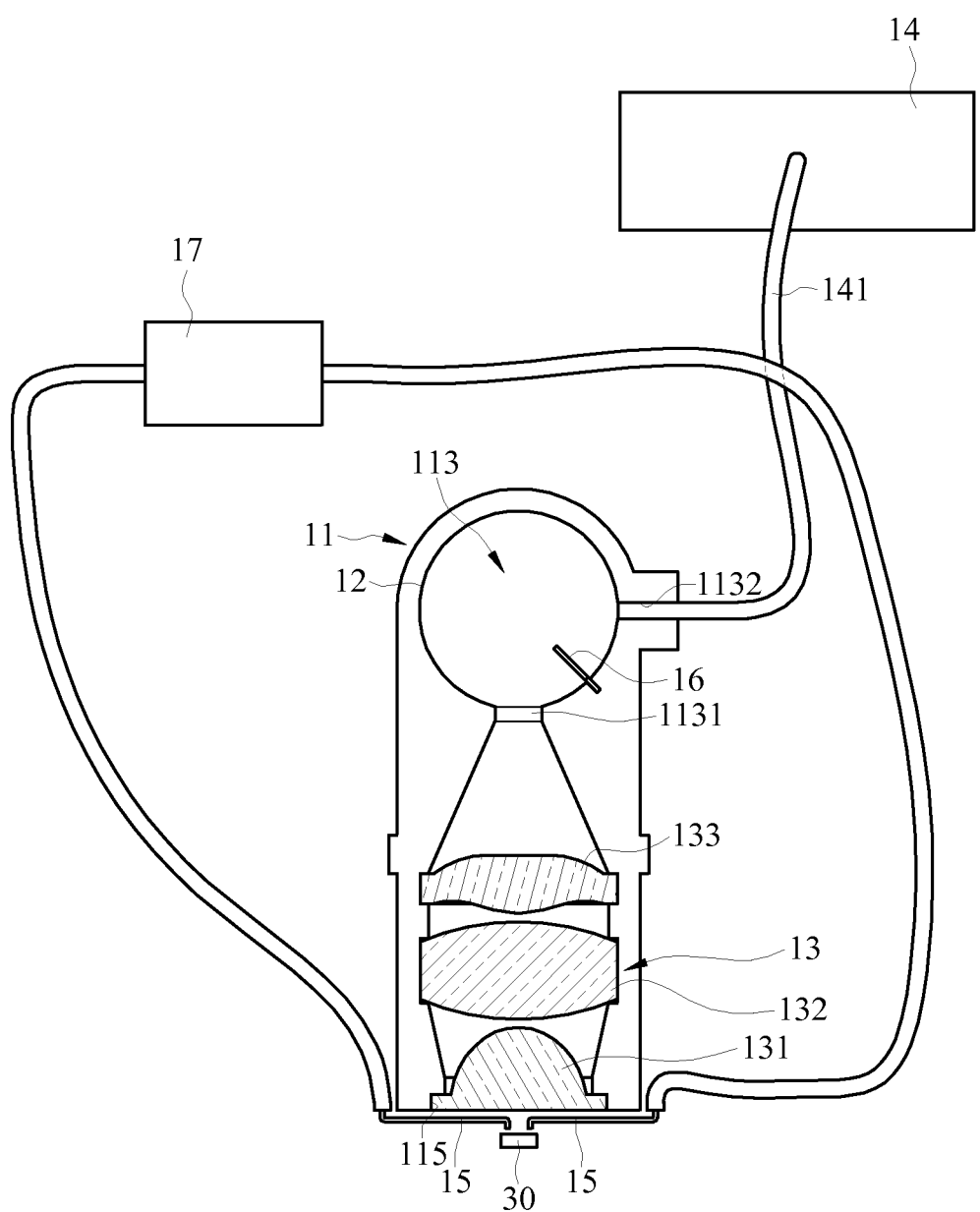
FIG. 3 is a sectional schematic view of an embodiment of the optical measuring device described in FIG. 1.

With reference to FIGS. 1 to 3, FIG. 1 is a schematic view of an embodiment of the optical measuring device of the present disclosure. FIG. 2 is a partial assembly section view of the embodiment the present disclosure described in FIG. 1. FIG. 3 is a sectional schematic view of an embodiment of the optical measuring device described in FIG. 1.

The optical measuring device 10 of the present disclosure includes a case 11, a reflective layer 12 and a light collecting lens module 13. A measuring chamber 113 and a channel 114, which is connected to the measuring chamber 113 and leads to an opening 115 of the case 11, reside in the case 11. The measuring chamber 113 is a spherical chamber substantially, and has a measuring chamber inlet 1131 through which the measuring chamber 113 is connected to the channel 114.

Specifically, the case 11 includes a first case part 111 and a second case part 112. The first case part 111 has a first cavity 1111 having one surface recessed inward and to which a first groove 1112 is connected. The shape of the first cavity 1111 is hemispherical substantially to which one end of the first groove 1112 is connected while the other end of the first groove 1112 is through the outer surface of the first case part 111. The second case part 112 has a second cavity 1121 having one surface recessed inward and to which a second groove 1122 is connected. The shape of the second cavity 1121 is hemispherical substantially to which one end of the second groove 1122 is connected while the other end of the second groove 1122 is through the outer surface of the second case part 112. Once the first case part 111 and the second case part 112 are joined, the first cavity 1111 and the second cavity 1121 together form the measuring chamber 113, whereas the first groove 1112 and the second groove 1122 together form the channel 114. The opening 115 is formed when the end of the first groove 1112 that penetrates the outer surface of the first case part 111 and the end of the second groove 1122 that penetrates the outer surface of the second case part 112 are joined together.

The case 11 in the embodiment of the present disclosure includes two case parts (the first case part 111 and the second case part 112), but is not limited to the disclosure. For example, in some embodiments of the present disclosure the case 11 is composed of more than three case parts.

The reflective layer 12 is disposed onto an inner surface of the measuring chamber 113. The reflective layer 12 may be formed of a barium sulfate, but is not limited to the disclosure. In some embodiments of the present disclosure, the reflectance of the reflective layer 12 is more than 95%.

The light collecting lens module 13 includes at least two positive lenses and is installed inside the channel 114. In more detail, the light collecting lens module 13 in the embodiment of the present disclosure comprises a first lens 131, a second lens 132 and a third lens 133 where the first lens 131, the second lens 132 and the third lens 133 are all positive lenses. The first lens 131 is next to the opening 115, the third lens 133 is next to the measuring chamber 113, and the second lens 132 is located between the first lens 131 and the third lens 133.

In addition, the measuring chamber 113 has a measuring chamber outlet 1132. In this and some embodiments, the optical measuring device 10 includes a detection processor 14 that is a photodetector or a spectrometer, but is not limited to the disclosure, and is installed at the measuring chamber outlet 1132 of the measuring chamber 113 through an optical transmission line 141.

When an object 30 to be tested (for example, a LED die) emits a light beam into the channel 114 through the opening 115 of the optical measuring device 10, the light beam passes through the first lens 131, the second lens 132 and the third lens 133 of the light collecting lens module 13 sequentially. The light beam gathered by the light collecting lens module 13 upon passing through thereof, enters the measuring chamber 113 through the measuring chamber inlet 1131. In addition, the reflective layer 12 inside the measuring chamber 113 causes the light beam to be reflected multiple times and to decay gradually. The spherical measuring chamber 113 makes the reflected light beam eventually uniformly distributed across the space inside the measuring chamber 113. Using the optical transmission line 141 to acquire the uniformly distributed illuminance inside the measuring chamber 113, the detection processor 14 collects optical signals and obtains optical information of the object 30.

The measuring chamber 113 in the embodiment of the present disclosure provides the effect of an integrating sphere whereas the light collecting lens module 13 is to reduce the cross section area of the incoming light beam in order to minimize the measuring chamber inlet 1131 of the measuring chamber 113 therefore resulting in the size reduction of the measuring chamber 113 and the optical measuring device 10 as a whole.

Furthermore, the optical measuring device 10 in the embodiment of the present disclosure may include a power supply connector 15 and a power supply device 17. The power supply connector 15 is located at the opening 115 and electrically connected to the power supply device 17. Thus, when the object 30 to be tested is a LED die, the object 30 is powered and lights up by the electricity provided from the power supply connector 15 that is in contact with the object 30. Therefore, the optical measuring device 10 can provide electrical power and conducting measurements simultaneously on various objects 30.

Furthermore, in the present embodiment and some embodiments of the present disclosure, the optical measuring device 10 includes a baffle 16, which is installed inside the measuring chamber 113 between the measuring chamber inlet 1131 and the measuring chamber outlet 1132, to prevent the light beam passing from the measuring chamber inlet 1131 directly to the measuring chamber outlet 1132 prior to a thorough reflection process in order to ensure that optical signals of the distributed flux of the light beam collected by the detection processor 14 are of good accuracy.

Figure 4:
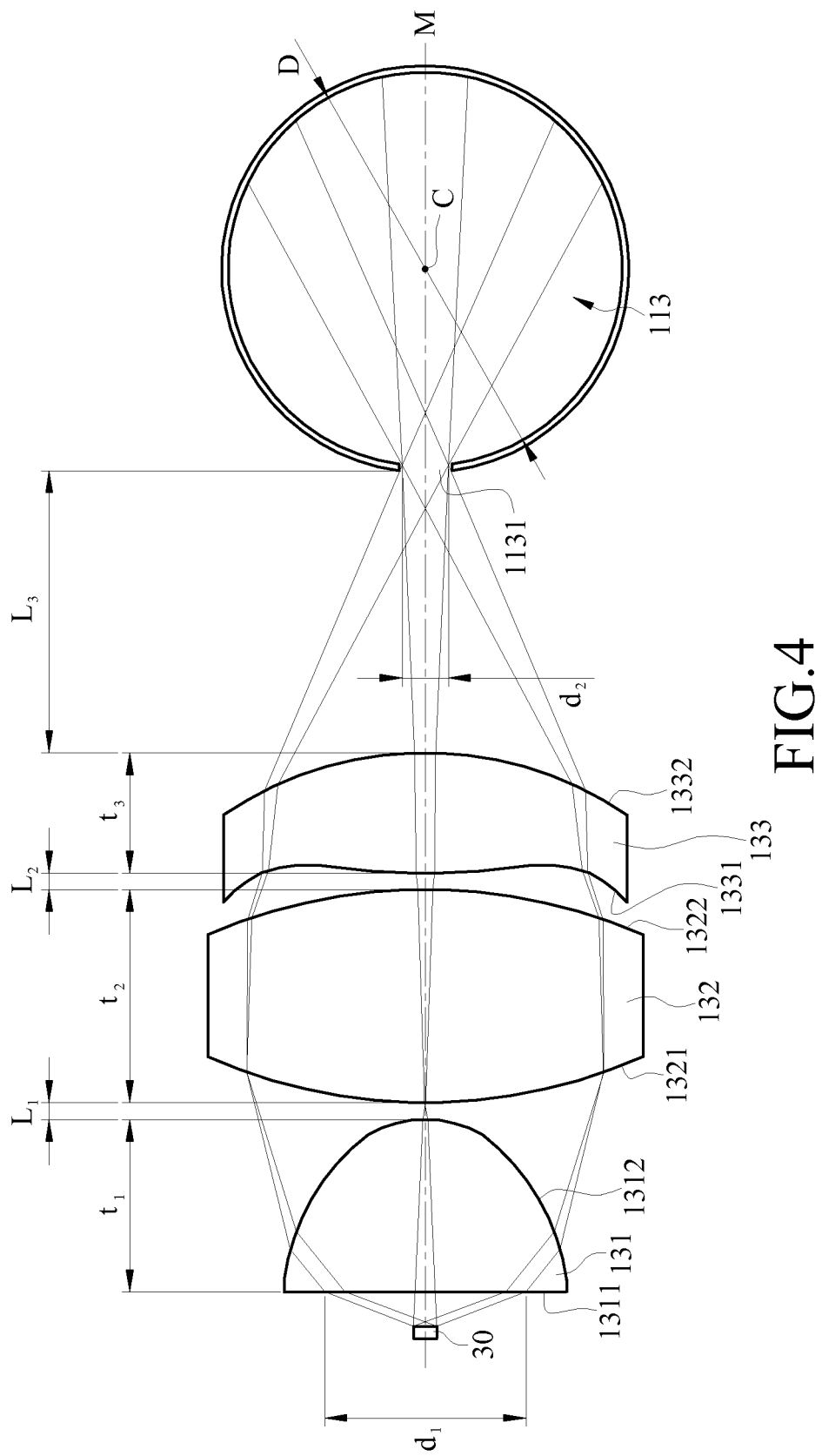
FIG. 4 is the optical path of the object with respect to the optical measuring device in the embodiment described in FIG. 1.

With reference to FIG. 4, FIG. 4 is the optical path of the object to be tested with respect to the optical measuring device in the embodiment described in FIG. 1. For use of illustration and explanation, only the initial optical path of the light beam that reaches the inner surface of the measuring chamber 113 is presented.

Next, descriptions of the size and feature of the light collecting module 13 and the measuring chamber 113 are given as follows. As illustrated in FIG. 4, an optical axis M of the light collecting lens module 13 passes through a geometric center point C of the measuring chamber 113 in the present embodiment. Since the shape of the cavity inside the measuring chamber 113 is nearly spherical, the geometric center point C is approximately the center point of the measuring chamber 113. Having the optical axis M of the light collecting lens module 13 passing through the geometric center point C of the measuring chamber 113, the optical measuring device 10 is able to conduct measurements with accuracy.

The material of the first lens 131 is plastic and the first lens 131, whose thickness t1 along the optical axis M is 2.1 millimeters (mm), has a first object side surface 1311 and a first image side surface 1312 that faces toward the measuring chamber 113.

The material of the second lens 132 is glass (model Schott-NSF5) and the second lens 132, whose thickness t2 along the optical axis M is 2.5 mm at a distance L1 of 0.2 mm apart from the first lens 131 on the optical axis M, has a second object side surface 1321 and a second image side surface 1322 that faces toward the measuring chamber 113.

The material of the third lens 133 is plastic and the third lens 133, whose thickness t3 along the optical axis M is 1.5 mm at a distance L2 of 0.2 mm apart from the second lens 132 and at a distance L3 of 3.5 mm apart from the measuring chamber inlet 1131 on the optical axis M, has a third object side surface 1331 and a third image side surface 1332 that faces toward the measuring chamber 113.

Information of the radii for the first object side surface 1311, the first image side surface 1312, the second object surface 1321, the second image side surface 1322, the third object side surface 1331 and the third image side surface 1332 is shown in Table 1 below.

TABLE I

| | Radius (mm) |
|---|---|
| The first object side surface 1311 | Infinity (i.e. plane) |
| The first image side surface 1312 | A(1) |
| The second object side surface 1321 | 6.18 |
| The second image side surface 1322 | −6.18 |
| The third object side surface 1331 | A(2) |
| The third image side surface 1332 | A(3) | where A(1), A(2) and A(3) are aspheric surfaces defined by the equation below, $$z = \frac{cy^2}{1 + (1 - (1+k)c^2y^2)^{1/2}} + \sum A_j y^{2j}$$

Wherein c is the base curvature of the vertex, k is the conic constant, and $A_j y^{2j}$ is the coefficient of high-order aspheric surface.

Values of A(1), A(2) and A(3) of the embodiment described in Table I are shown in Table II.

TABLE II

| Aspheric Surface Number | c | k | $A_1$ | $A_2$ | $A_3$ |
|---|---|---|---|---|---|
| A(1) | −0.67121808 | −0.591554 | 0 | −2.82440E−02 | 3.18504E−03 |
| A(2) | 0.36631263 | 0 | −1.33511E−02 | −6.60683E−03 | 3.54702E−04 |
| A(3) | −0.04121493 | 0 | −1.57335E−02 | −2.11851E−03 | 3.82795E−04 |

With reference to FIG. 4 again, for instance, the light beam in the embodiment that emits from the object 30 has a beam angle of plus-minus 70 degrees and a beam incident area, whose diameter d1 at the first object side surface 1311 is 2.41 mm. After the light beam passes the light collecting lens module 13, the diameter d2 of the beam convergent area at the measuring chamber inlet 1131 is reduced to 0.52 mm. Therefore, the diameter of the measuring chamber inlet 1131 only needs to be 0.52 mm or more, as a result, leading the inner diameter D of the measuring chamber 113 to be 3 mm thereof (the inner diameter D of the measuring chamber 113 is about 5 times the diameter of the measuring chamber inlet 1131).

Figure 5:
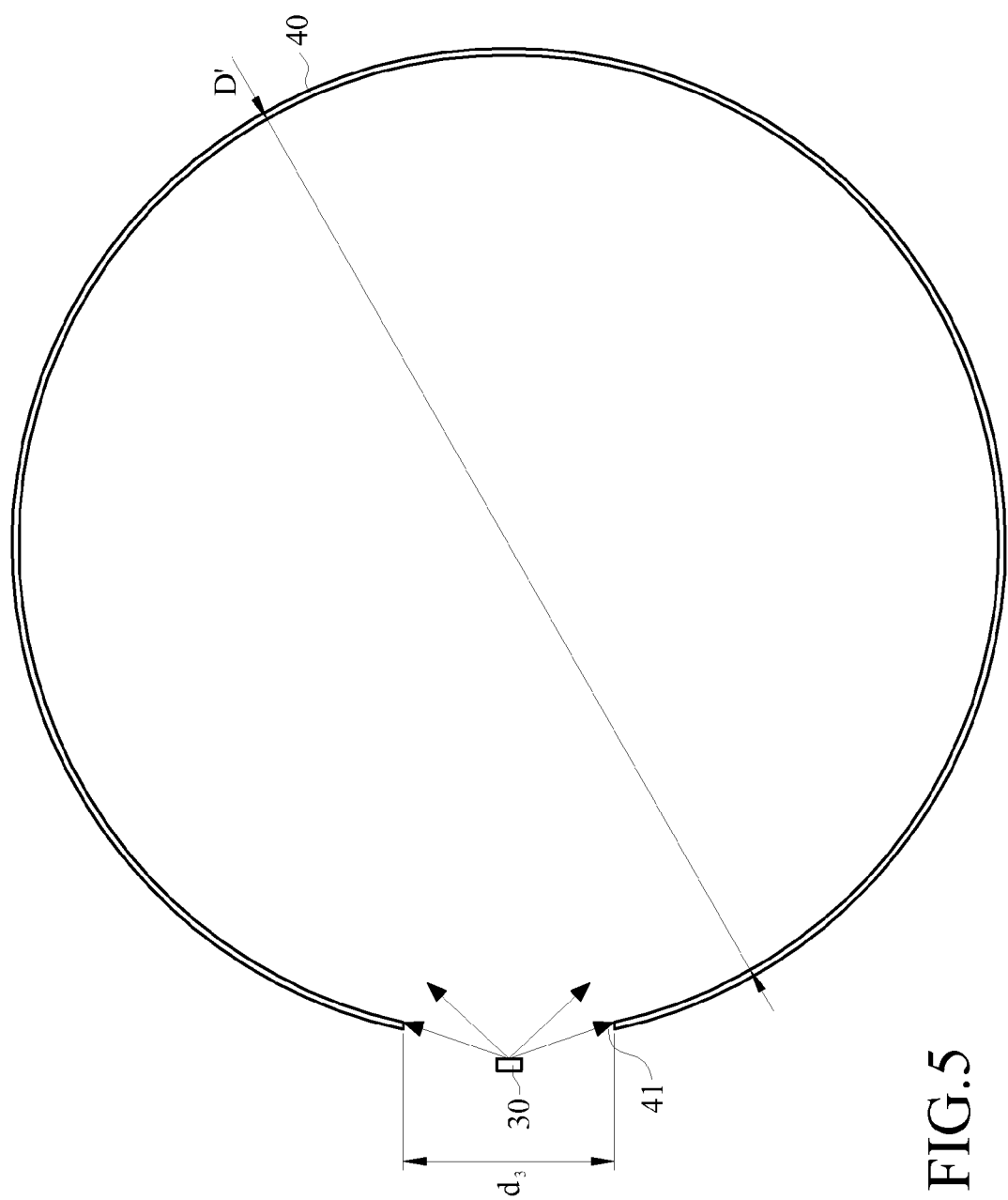
FIG. 5 is the optical path of the object with respect to the integrating sphere in the prior art.

With reference to FIG. 5, FIG. 5 is the optical path of an object to be tested with respect to an integrating sphere in the prior art. According to the prior art, using the integrating sphere 40 to directly measure the light beam, that emits from the same object 30 and has a beam angle of plus-minus 70 degrees, without relying on the light collecting lens module 13 to gather the light beam at the opening 41 of the integrating sphere 40, the diameter d3 of the opening 41 of the integrating sphere 40 need to be larger than 2.41 mm. By the same token, the inner diameter D' of the integrating sphere 40 need to be larger than 14 mm.

In comparison to the inner diameter D' of the integrating sphere 40 described in FIG. 5, the inner diameter D of the measuring chamber 113 of the optical measuring device 10 in the present embodiment described in FIG. 4 is only 20% of the inner diameter D' of the integrating sphere 40 of the prior art when the beam incident area of the same object 30 is measured. In other words, using both the light collecting lens module 13 and the measuring chamber 113 of the present embodiment can reduce the overall size of the optical measuring device 10.

The light collecting lens module 13 that includes three positive lenses in the present disclosure is for illustration only, and thus is not limitative of the present disclosure, especially in terms of quantity of the lens used.

Figure 6:
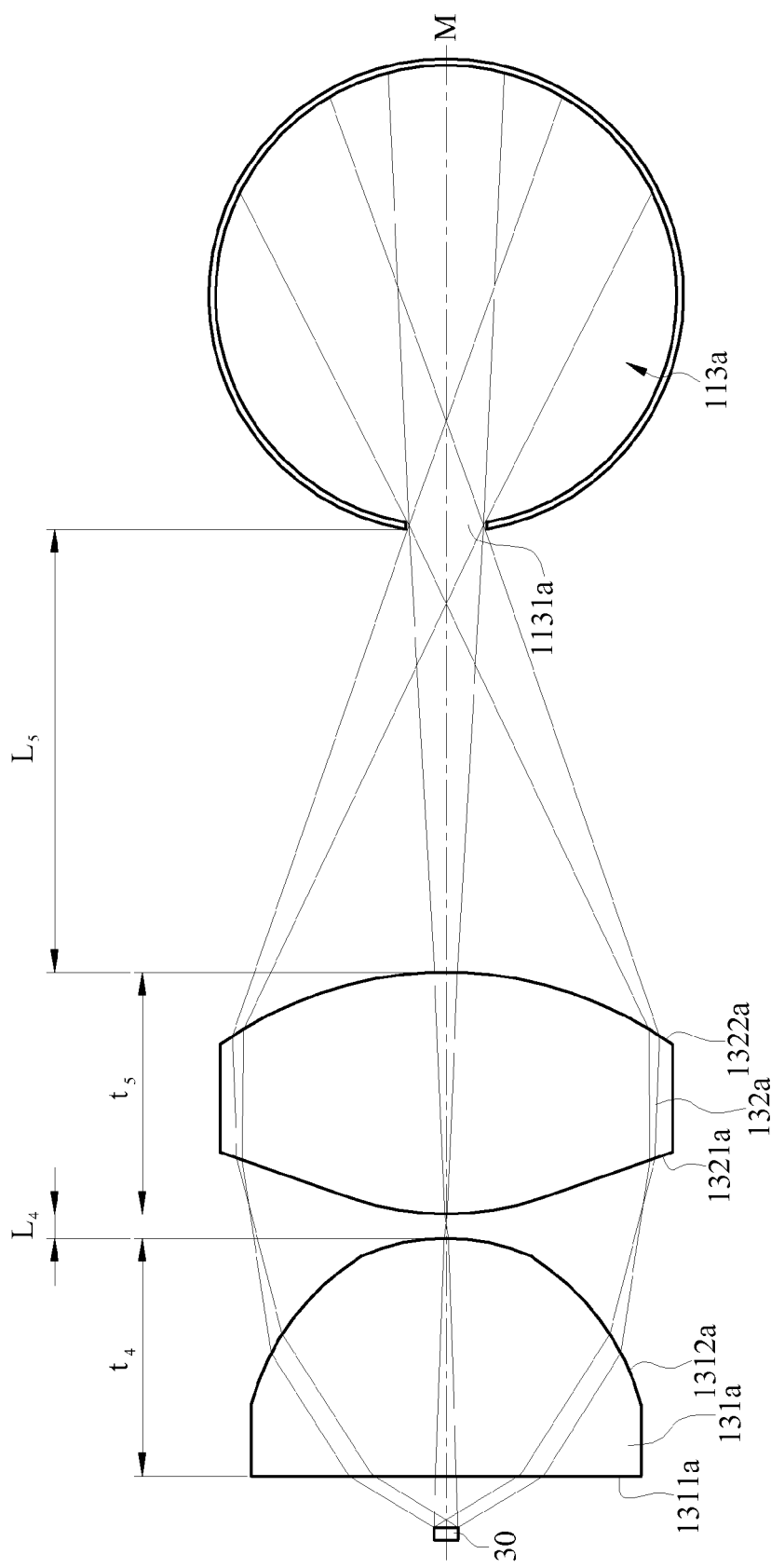
FIG. 6 is the optical path of the object with respect to the optical measuring device in another embodiment of the present disclosure.

In reference to FIG. 6, FIG. 6 is the optical path of the object with respect to the optical measuring device in another embodiment of the present disclosure. In this embodiment, the optical measuring device detects the light beam that emits from the object 30 with a beam angle of plus-minus 60 degrees. The light collecting lens module 13a only includes a first lens 131a and a second lens 132a. The material of the first lens 131a is plastic and the first lens 131a, whose thickness t4 along the optical axis M is 1.95 mm, has a first object side surface 1311a and a first image side surface 1312a that faces toward the measuring chamber 113a.

The material of the second lens 132a is plastic and the second lens 132a, whose thickness t5 along the optical axis M is 1.96 mm at a distance L4 of 0.2 mm apart from the first lens 131a and at a distance L5 of 3.6 mm apart from the measuring chamber inlet 1131a on the optical axis M, has a second object side surface 1321a and a second image side surface 1322a that faces toward the measuring chamber 113a.

Information of the radii for the first object side surface 1311a, the first image side surface 1312a, the second object surface 1321a and the second image side surface 1322a is displayed in Table III below.

TABLE III

| | Radius (mm) |
|---|---|
| The first object side surface 1311a | Infinity (i.e. plane) |
| The first image side surface 1312a | A(1) |
| The second object side surface 1321a | A(2) |
| The second image side surface 1322a | A(3) | where A(1), A(2) and A(3) are aspheric surfaces defined by the equation below, $$z = \frac{cy^2}{1 + (1 - (1+k)c^2y^2)^{1/2}} + \sum A_j y^{2j}$$

Wherein c is the base curvature of the vertex, k is the conic constant, and $A_j y^{2j}$ is the coefficient of high-order aspheric surface.

Values of A(1), A(2) and A(3) of the embodiment described in Table III are shown in Table IV.

TABLE IV

| Aspheric Surface Number | c | $A_1$ | $A_2$ | $A_3$ |
|---|---|---|---|---|
| A(1) | −0.59549251 | −2.99357E−02 | −2.07468E−02 | 8.16675E−03 |
| A(2) | 0.48268051 | −6.01528E−02 | 6.66067E−03 | −1.58984E−03 |
| A(3) | −0.37420171 | 2.96909E−02 | −9.57480E−03 | 1.43861E−03 |

Figure 7:
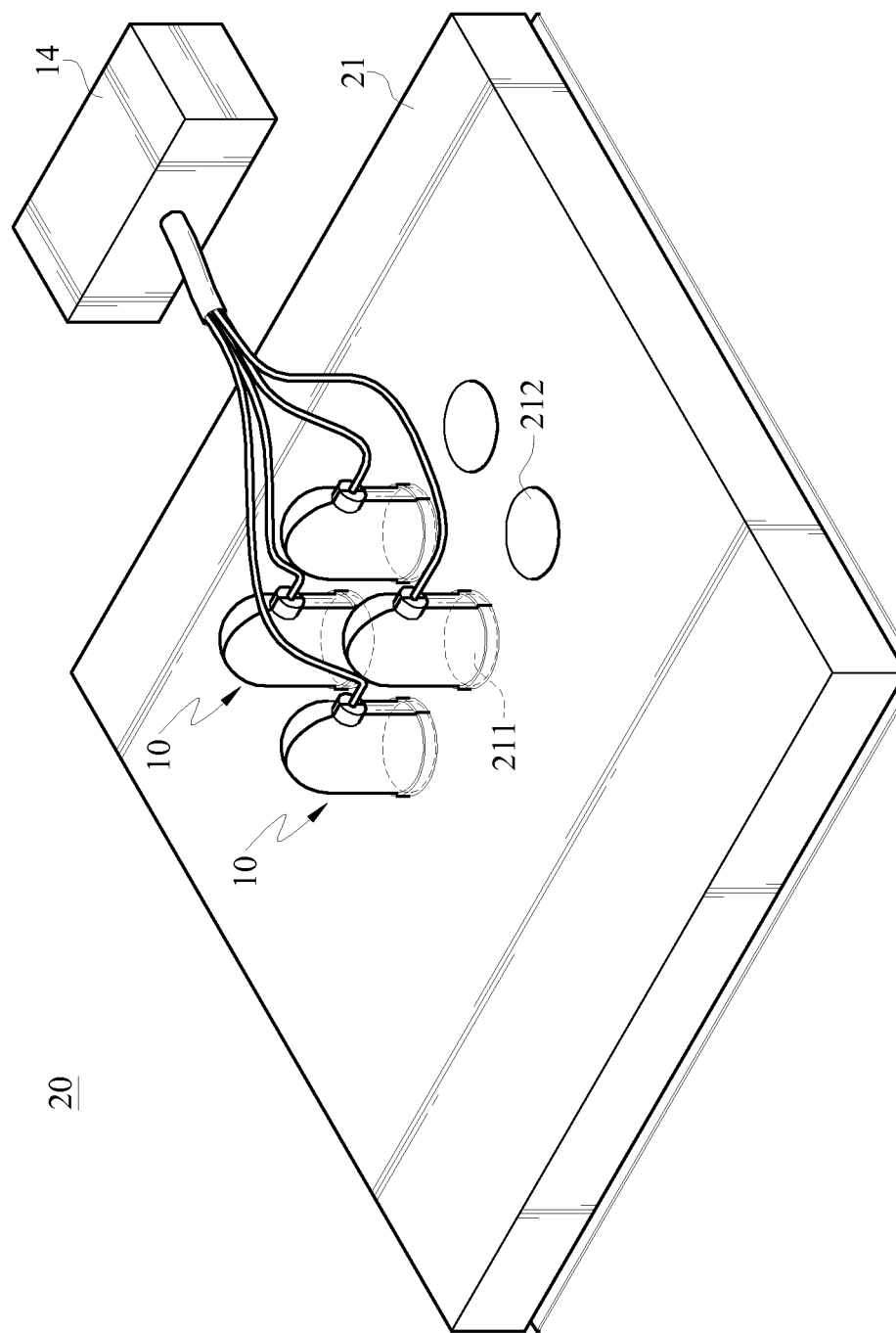
FIG. 7 is a schematic structural view of the optical measuring system in the embodiment of the present disclosure and FIG. 8 is a sectional view of the optical measuring system in the embodiment described in FIG. 7.
Figure 8:
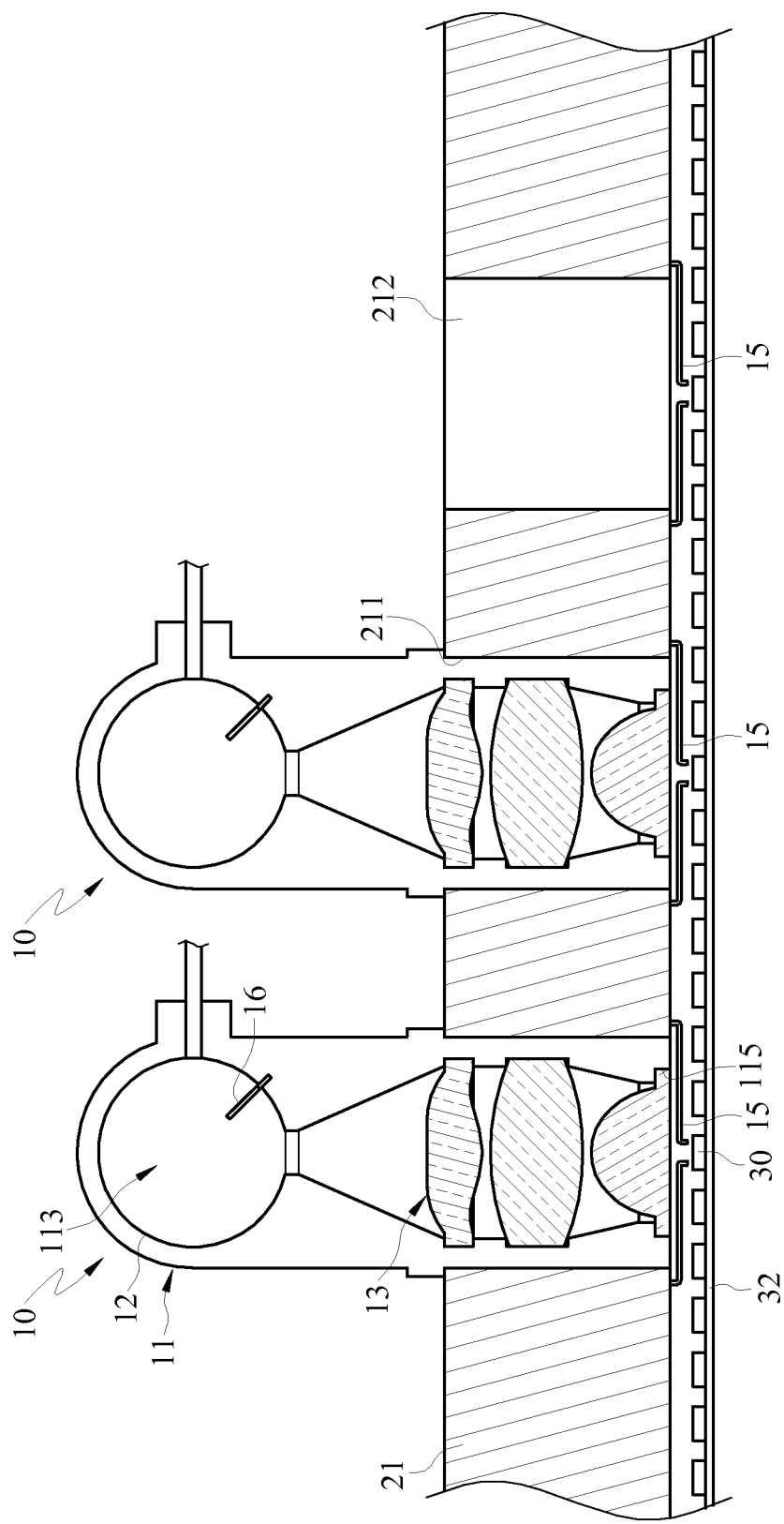

With reference to FIG. 7 and FIG. 8, FIG. 7 is a schematic structural view of the optical measuring system in the embodiment of the present disclosure and FIG. 8 is a sectional view of the optical measuring system in the embodiment described in FIG. 7.

An optical measuring system 20 of the embodiment includes a base 21, a plurality of optical measuring devices 10, a plurality of power supply connectors 15 and at least a detection processor 14.

Substantially, the base 21 is a plate with a plurality of through holes 211 that are arranged in matrix layout when grouped thereto. In the present embodiment, the layout of the set of through holes 211 is arranged in a 2×2 matrix for illustration only, and thus is not limitative of the present disclosure, especially in terms of quantity of the through holes and layout used.

In addition, each optical measuring device 10 includes a case 11, a reflective layer 12, a light collecting lens module 13 and a baffle 16. The detail structure of each component of the optical measuring device 10 and the relative positions of the components with respect to each other are similar to those in the embodiments described in FIG. 1 to FIG. 3, and thus no further descriptions are provided. Each optical measuring device 10 is assembled to the through hole 211 on the base 21, in a matrix layout thereof.

Each power supply connector 15 is installed in the base 21 corresponding to the location of the through holes 211 and matched to the opening 115 of the optical measuring device 10.

The detection processor 14 is connected to the measuring chamber 113 of each optical measuring device 10. In other words, the present embodiment demonstrates a case using one detection processor 14 to connect to all measuring chambers 113 for illustration only, and thus is not limitative of the present disclosure. For instance, multiple units of the detection processor 14 are used and each optical measuring device 10 is connected to a single or to a plurality of detection processor 14 in other embodiments.

As illustrated in FIG. 8, a plurality of objects 30 are arranged in a matrix layout on a test plate 32 whereas the objects 30 may be LED dice and the test plate 32 may be a wafer. Due to the fact that each optical measuring device 10 of the present disclosure has a relative smaller size than that of the prior art, the optical measuring device 10 of the present embodiment can also be arranged in the same matrix layout on the base 21 and matched to the matrix layout of the LED dice. Therefore the optical measuring system 20 is able to perform optical measurement on multiple objects 30 on the test plate 32 simultaneously and to increases the efficiency of the optical measuring process.

Moreover, the base 21 in the present embodiment has an alignment hole 212 where a power supply connector 15 is installed. When the base 21 is over the position of the object 30, operators can examine visually the alignment between the power supply connector 15 at the alignment hole 212 and the object 30 below, by means of the relative setting of the alignment hole 212 with respect to the optical measuring devices 10, thus to ensure that each of the power supply connector 15 assigned to an optical measuring device 10 is in contact with the object 30 laid below in order to facilitate the measuring process subsequently.

The present disclosure relates to an optical measuring system and an optical measuring device that, by reducing the size of the optical measuring device, thereby allow multiple optical measuring devices to be utilized simultaneously on a LED wafer to increase the efficiency of optical measurements.

According to the optical measuring system and the optical measuring device of the embodiments described above, using both the light collecting lens module and the measuring chamber can reduce the overall size of the optical measuring device. Besides, the size reduction of the optical measuring device and the setting of a matrix layout for the multiple optical measuring devices on a base allow the optical measuring system of the embodiment of the present disclosure to perform optical measurement on multiple objects simultaneously, thus increasing the efficiency of optical measurement.

What is claimed is:

1. An optical measuring device, comprising:
    a case including a measuring chamber and a channel which is connected to the measuring chamber and is connected to an opening of the case;
    a reflective layer placed on an inner surface of the measuring chamber; and
    a light collecting lens module located inside the channel, the optical measuring device is adapted for letting a light beam emit into the channel of the optical measuring device through an opening, pass through the light collecting lens module and enter the measuring chamber;
    wherein the optical measuring device is configured to detect the light beam with a beam angle of plus-minus 60 to plus-minus 70 degrees.

2. The optical measuring device according to claim 1, further comprising a power supply connector that is located at the opening of the case.

3. The optical measuring device according to claim 2, further comprising a power supply device that is connected to the power supply connector.

4. The optical measuring device according to claim 1, further comprising a detection processor that is connected to the measuring chamber.

5. The optical measuring device according to claim 4, further comprising a baffle positioned inside the measuring chamber and between a measuring chamber inlet and a measuring chamber outlet; the measuring chamber inlet being connected to the channel and the measuring chamber outlet is connected to the detection processor.

6. The optical measuring device according to claim 1, wherein the optical measuring device includes a first case part and a second case part, the first case part has a first cavity with one surface recessed inward and to which a first groove is connected; the second case part has a second cavity with one surface recessed inward and to which a second groove is connected; and once the first case part and the second case part are joined, the first cavity and the second cavity together form the measuring chamber, and the first groove and the second groove together form the channel.

7. The optical measuring device according to claim 1, wherein the light collecting lens module includes at least two positive lenses.

8. The optical measuring device according to claim 7, wherein at least one of the two positive lenses is an aspheric lens.

9. The optical measuring device according to claim 1, wherein an optical axis of the light collecting lens module passes through a geometric center point of the measuring chamber.

10. An optical measuring system, comprising:
   a base;
   a plurality of optical measuring devices which are placed on the base and configured to detect a light beam with a beam angle of plus-minus 60 to plus-minus 70 degrees, and each optical measuring device includes:
      a case including a measuring chamber and a channel which is connected to the measuring chamber and is connected to an opening of the case;
      a reflective layer on an inner surface of the measuring chamber; and
      a light collecting lens module inside the channel;
   a plurality of power supply connectors, each of which is located at the opening of the case; and
   at least a detection processor connected to the measuring chamber.

11. The optical measuring system according to claim 10, wherein the base has an alignment hole where a power supply connector is installed.

12. The optical measuring system according to claim 10, wherein the base has a plurality of through holes and each power supply connector is installed in the base corresponding to the location of the through hole and matched to the opening of the optical measuring device.

* * * * *